April 5, 1949.  F. S. DENNEEN ET AL  2,466,007

POWER CABINET

Filed Aug. 4, 1944

INVENTORS
Francis S. Denneen
William C. Denner

Patented Apr. 5, 1949

2,466,007

UNITED STATES PATENT OFFICE 2,466,007

POWER CABINET

Francis S. Denneen, Cleveland, and William C. Dunn, Shaker Heights, Ohio, assignors to The Ohio Crankshaft Company, Cleveland, Ohio, a corporation of Ohio Application August 4, 1944, Serial No. 548,084

4 Claims. (Cl. 171—252)

The present application as a continuation in part of our application Serial No. 304,986 for Sink construction, filed November 17, 1939, now abandoned, is directed to a combination of elements including an enclosing cabinet for heat treating by high frequency induced current. It is particularly directed to a compact unitary structure which can be readily moved in its entirety from one place to another in a shop, or manufacturing plant where heat treating equipment is used.

Generally, equipment embodying our invention is adapted to use where current of relatively high voltage is employed and in places where dust or other atmospheric conditions are harmful to apparatus of this character. Accordingly the invention provides a base for supporting the electrical apparatus employed and a framework usually of dielectric material for carrying the top and sides of an enclosure for the apparatus. The top which may assume many forms usually serves as a work table and the sides are provided as removable panels to make the apparatus within the cabinet accessible.

The general object of the invention has been to provide a construction of the type indicated which permits the safe use of high voltage electricity. Another object has been to provide means for enclosing and protecting electrical generating and transforming apparatus. A further object has been to provide means to regulate operating temperatures of such apparatus. Another object has been to provide low temperature quenching fluid. A still further object has been to provide means for the ready removal of parts from the cabinet.

To the accomplishment of the foregoing and related ends, said invention, then, consists of the means hereinafter fully described and particularly pointed out in the claims; the annexed drawing and the following description setting forth in detail certain means and one mode of carrying out the invention, such disclosed means and mode illustrating, however, but one of various ways in which the principle of the invention may be used.

In said annexed diagrammatic drawings.

Figure 1:
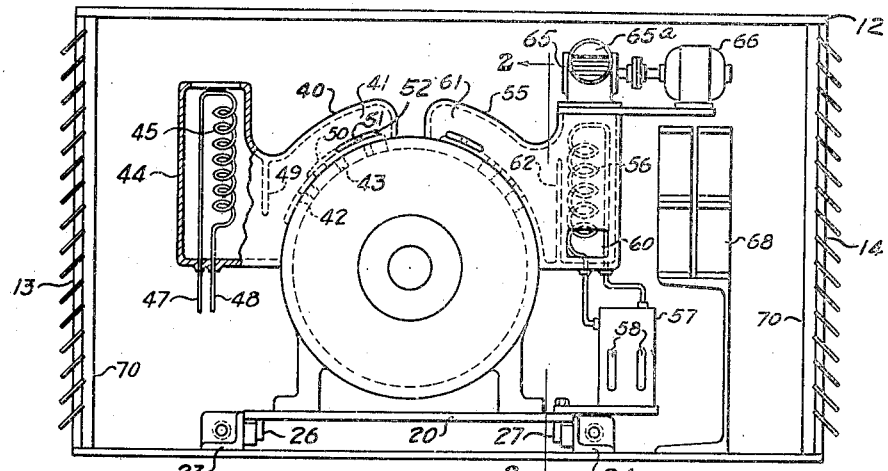
Fig. 1 is an elevation of our apparatus as seen from one end but with the end panel of the cabinet removed.
Figure 2:
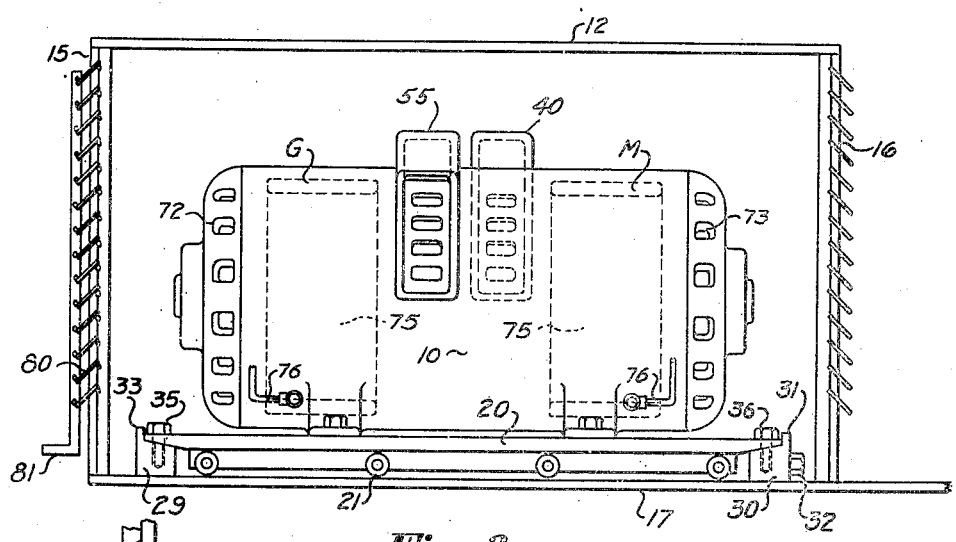
Fig. 2 is a side elevation of the motor-generator set substantially as indicated at 2—2 of Fig. 1.

Referring now to the drawings it will be seen that the apparatus comprises a unitary motor-generator set 10 within a cabinet having a top 12 and removable sides 13 and 14 with enclosing ends 15 and 16 also removable. The top, sides and ends are attached to a frame of structural angle form, but usually made from non-magnetic and preferably non-conducting material. The base 17 is usually a continuous metallic plate to which the angle frame members are attached. The motor generator is attached to a plate 20 which in turn is carried by cylindrical members 21 rolling on base 17 which permits the motor generator to be readily withdrawn from within the cabinet, base 17 extending some distance beyond one end of the cabinet to provide a track for the rollers when the motor generator on its plate 20 is rolled out. Angles 23 and 24 serve as guides for the plate and the rollers which are usually spaced by bars 26 and 27 attached to plate 20 and having holes to receive and support reduced ends of the rollers. The plate 20 is provided at its opposite ends with tapers, which, when the plate is in place within the cabinet, engage tapered supporting blocks 29 and 30 to raise the rollers off the base plate 17. Block 29 is stationary and block 30 extends across one end of the base plate and is brought into wedging engagement with the end of the plate 20 by means of screws 32 threaded into lugs attached to angles 23 and 24. The upwardly extending leg 31 of block 30 engages the end of plate 20 to force the tapered portion of the opposite end of the plate onto tapered block 29 and into engagement with upwardly extending leg 33 of this block. Screws 35 and 36 securely hold the plate in place on the blocks.

Since a considerable rise in temperature tends to occur in both the motor indicated at M and in the generator indicated at G, which reduces their efficiencies, means is provided to reduce this temperature to efficient limits. To that end, the temperature within the cabinet is usually maintained below that of the surrounding atmosphere and cooling fluid, usually air, is circulated independently through the generator and through the motor by fans usually forming a part of the armature structure of these units. The temperature of the circulating air is usually controlled by passing it over refrigerating coils before passing it through the motor and generator.

Since the motor usually requires less cooling than the generator its cooling is usually accomplished by passing the air over coils through which water at moderately low temperature is circulated. Apparatus for such cooling of the motor is indicated by the housing 40 of Fig. 1.

This housing comprises an arcuate portion 41 having wall 42 conforming with the cylindrical outer surface of the motor casing. This wall has passages which register with passages 43 in this casing. The vertical portion 44 of the housing 40 contains coils 45 through which water is circulated, pipes 47 and 48 delivering the water to the coils. A baffle 49 is provided to cause substantially all of the air entering at the top of housing 40 to pass over the coils before it enters the arcuate shell leading to the motor casing. An arcuate plate 50 shiftable by pin 51 extending through slot 52 to open and close passages in the wall 42 serves to regulate the amount of cooling air being delivered to the motor. It will be obvious that the temperature of the entering water and its rate of circulation determines the temperature of the air entering the motor.

The generator which usually generates more heat than the motor is often cooled in the same way, housing 55 being substantially like housing 40. However, additional cooling is frequently required and brine at a much reduced temperature is supplied to the coil 56 from refrigerating unit 57 which is usually located adjacent to the coil as shown. A radiator for condensing the compressed refrigerating gas is usually located exteriorly of the cabinet but adjacent to it, piping 58 serving as means for connecting the compressor and condenser. Air enters housing 55 through window 60 and passes upwardly over coils 56 before entering the arcuate portion 61 and the generator casing, baffle 62 constraining the air to pass over the coils.

Since considerable excess refrigerated air is usually available, a part of this refrigerated air is often used for quenching parts which have been inductively heated by current from the generator. This quenching air must be supplied at a moderate pressure and to that end a small blower 65 driven by motor 66 and taking air directly around from coils 56 in housing 55 is provided. Suitable piping for delivering the refrigerated air to or adjacent to such heating inductor as may be employed on the top 12 of the cabinet or elsewhere is not shown. The air employed for quenching is replenished by outside air entering through filters 70 carried by the panels of the cabinet.

Housings 40 and 55, particularly 55, are themselves ordinarily below normal temperatures, which will cool the interior of the cabinet. However, to further cool the cabinet a part of the air being delivered by the blower is permitted to escape through outlet 65A within the cabinet. This reduced temperature within the cabinet is advantageous to the operation of electric condensers 68 and numerous other parts of the apparatus contained within the cabinet such as coils, transformers and circuit breakers.

It will be understood that customary fans are incorporated in the armatures of the motor and generator to direct the refrigerated air into the desired parts of the apparatus. The air after passing through and cooling the armatures of the motor and generator is exhausted through passages 72 and 73 into the cabinet often at temperatures below that of the outside atmosphere.

Figure 3:
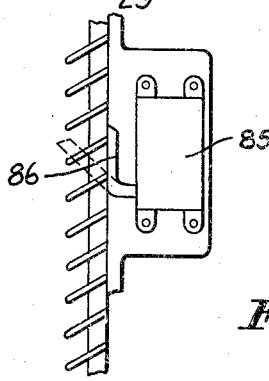
Fig. 3 is a detail of safety mechanism provided to safeguard the operator.

Ordinarily panel 13, although removable, is left as a fixed part of the cabinet and serves as a support for exterior piping and wiring, such piping and wiring being disconnected from the panel before the motor-generator is removed from the cabinet. Such parts as housings 40 and 55 and the refrigerating unit are ordinarily connected to the motor-generator and are removed from the cabinet with this motor-generator. To insure safety for the operators, switches 85 are mounted in the frame, each with an arm 86 normally extending, as indicated by broken lines into the spaced occupied by one of the panels such as 15. In the position indicated by the broken lines, the switch is open and the equipment is inoperative because current supply is cut off. In order to close the panels the arm must be shifted which is accomplished by the panel itself and the switch is closed (Fig. 3), thus allowing the apparatus to be operated. On the other hand, if a workman fails to replace a panel, the switch controlled thereby is open and the equipment can not be operated.

Supplementing the cooling effected by refrigerated air circulating through the armatures of the generator and motor, jackets 75 are provided in the frames of these units through which water from piping is circulated to further cool the wiring and other stationary mechanism of the apparatus.

In some installations the cabinet is filled with a special atmosphere, selected for its cooling qualities. In such cases the louvers 80 of all the panels are hinged to be readily closed, preferably by a rod 81, to substantially hermetically seal the cabinet against the entrance of outside air and to prevent the escape of the atmosphere provided therein.

It will be understood that the present apparatus can be constructed in many modified forms. For instance, the cooling and refrigerating apparatus may be applied to an electronic tube generator or spark gap generator. Also a fan with suitable shrouding in some cases is attached to motor 66 to circulate the atmosphere in the cabinet to effectively cool not only the generator unit but all other parts such as condensers, transformers, and circuit breakers.

Other modes of applying the principle of our invention may be employed instead of the one explained, change being made as regards the structure herein disclosed, provided the means stated by any of the following claims or the equivalent of such stated means be employed.

We therefore particularly point out and distinctly claim as our invention:

1. In a power unit, a cabinet, a motor and high frequency generator set having a retractable base secured thereto and adapted to carry the said set into and out of the cabinet, a movable substantially fluid-tight side panel having its lower edge substantially flush with the plane on which said set moves adapted to close the cabinet after said set has been inserted therein to prevent an escape of cooling fluid from the cabinet, means for securing the base to hold the motor generator set in a predetermined position in the cabinet, and fluid conducting means adapted to be inserted into the cabinet with said base and the motor generator set, for delivering a part of the cooling fluid directly into interior parts of said set, the fluid conducting means comprising means for controlling the delivery of the fluid from the cabinet into the interior parts of the set.

2. In a power unit, a cabinet adapted to contain a cooling fluid, a motor and high frequency generator set having a retractable base adapted to carry the said set into and out of the cabinet, a movable substantially fluid-tight panel having its lower edge substantially flush with the plane on which said set moves serving as a side wall of the cabinet and being adapted to close the cabinet after said base has been inserted therein to prevent an escape of cooling fluid from said cabinet, means for removably securing the base to hold the motor generator set in spaced relation with walls of the cabinet, means carried by said base for refrigerating the cooling fluid, and fluid conducting means fitted to a wall of the motor generator set for delivering cooling fluid from the refrigerating means into a part of the motor generator set.

3. In an electric power generating unit, a cabinet adapted to contain a cooling fluid, a generator for high frequency current having a roller supported base with guiding means adapted to carry the generator into a definite location in the cabinet, a substantially fluid-tight panel having its lower edge substantially flush with the plane on which said set moves serving as a wall of the cabinet and being adapted to close the cabinet after the base has been inserted therein to prevent an escape of cooling fluid from the cabinet, and means for raising the base to relieve the roller support and to hold the generator firmly in spaced relation with the walls of the cabinet, said means providing a space for a circulation of the fluid around the generator to cool said generator.

4. In a power unit, a cabinet adapted to contain a cooling fluid, a generator for high frequency current having a roller supported base adapted to carry the generator into the cabinet, the cabinet having a floor member serving as a track for the rollers, a substantially fluid-tight panel having its lower edge substantially flush with the plane on which said set moves serving as a wall of the cabinet and being adapted to close the cabinet after the base has been inserted therein to prevent an escape of cooling fluid from the cabinet, and means for raising said base to eliminate pressure of the rollers on the floor, said means holding the generator securely in spaced relation with walls and floor of the cabinet.

FRANCIS S. DENNEEN.
WILLIAM C. DUNN.

REFERENCES CITED

The following references are of record in the file of this patent:

UNITED STATES PATENTS

| Number | Name | Date |
|---|---|---|
| 355,553 | Paget | Jan. 4, 1887 |
| 724,089 | Edison | Mar. 31, 1903 |
| 918,297 | Duffy | Apr. 13, 1909 |
| 1,315,996 | Simmon | Sept. 16, 1919 |
| 1,352,509 | Griswold | Sept. 14, 1920 |
| 1,427,416 | Ray | Aug. 29, 1922 |
| 1,453,083 | Schuler | Apr. 24, 1923 |
| 1,972,315 | Ramey | Sept. 4, 1934 |
| 2,135,685 | Wells | Nov. 8, 1938 |
| 2,249,882 | Buchanan | July 22, 1941 |
| 2,264,268 | Arnold | Dec. 2, 1941 |